(12) United States Patent
Volfson

(10) Patent No.: US 11,774,732 B2
(45) Date of Patent: Oct. 3, 2023

(54) CONTINUOUS ZOOM AFOCAL LENS ASSEMBLY

(71) Applicant: Torrey Pines Logic, Inc., San Diego, CA (US)

(72) Inventor: Leo Volfson, Del Mar, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 901 days.

(21) Appl. No.: 16/477,872

(22) PCT Filed: Jan. 12, 2018

(86) PCT No.: PCT/US2018/013664
§ 371 (c)(1),
(2) Date: Jul. 12, 2019

(87) PCT Pub. No.: WO2018/132767
PCT Pub. Date: Jul. 19, 2018

(65) Prior Publication Data
US 2019/0369373 A1  Dec. 5, 2019

Related U.S. Application Data

(60) Provisional application No. 62/446,301, filed on Jan. 13, 2017.

(51) Int. Cl.
*G02B 15/20* (2006.01)
*G02B 7/10* (2021.01)
(Continued)

(52) U.S. Cl.
CPC ..... *G02B 15/144507* (2019.08); *G02B 7/021* (2013.01); *G02B 7/10* (2013.01);
(Continued)

(58) Field of Classification Search
CPC ............. G02B 15/14; G02B 15/144507; G02B 15/20; G02B 15/12; G02B 15/144;
(Continued)

(56) References Cited

U.S. PATENT DOCUMENTS 4,132,463 A  1/1979 Sakaguchi et al.
4,802,717 A *  2/1989 Kebo ............ G02B 13/22
359/422

(Continued)

FOREIGN PATENT DOCUMENTS

GB  1383853 A  2/1974
JP  H04247417 A  9/1992
(Continued)

OTHER PUBLICATIONS

Lee et al, "A novel smooth impact drive mechanism actuation method with dual-slider for a compact zoom lens system", Review of Scientific Instruments 82, 085105 (2011) (Year: 2011).*

(Continued)

*Primary Examiner* — Jie Lei
(74) *Attorney, Agent, or Firm* — Alliance IP, LLC

(57) ABSTRACT

Aspects of the embodiments include an optical device comprising a housing; and an afocal lens assembly comprising a zoom lens in the housing, the zoom lens supported in the housing to move along a long axis of the housing. The afocal lens assembly can also include an objective lens configured to move synchronously with the zoom lens based on rotation of a zoom+focus adjustment knob coupled to a lens driving mechanism.

16 Claims, 6 Drawing Sheets

(51) Int. Cl.
  *G02B 13/18* (2006.01)
  *G02B 7/02* (2021.01)
  *G02B 13/14* (2006.01)
  *G03B 13/32* (2021.01)
  *H04N 5/33* (2023.01)
  *G02B 15/14* (2006.01)

(52) U.S. Cl.
  CPC .............. *G02B 13/14* (2013.01); *G02B 13/18* (2013.01); *G02B 15/20* (2013.01); *G03B 13/32* (2013.01); *H04N 5/33* (2013.01)

(58) Field of Classification Search
  CPC ........ G02B 15/143; G02B 7/00; G02B 7/004; G02B 7/02; G02B 7/021; G02B 7/023; G02B 7/10; G02B 27/01; G02B 27/21; G02B 27/4211; G02B 27/0037; G03B 13/18; G03B 13/32; H04N 5/33
  USPC ....... 359/356, 618, 744, 350, 354, 676, 728, 359/563, 565, 357
  See application file for complete search history.

(56) References Cited

U.S. PATENT DOCUMENTS

| | | |
|---|---|---|
| 4,952,041 A | 8/1990 | Sandall |
| 5,044,706 A | 9/1991 | Chen |
| 5,491,588 A | 2/1996 | Ogawa et al. |
| 5,493,441 A * | 2/1996 | Chipper ............. G02B 27/4211 359/357 |
| 5,796,514 A | 8/1998 | Chipper |
| 2015/0156380 A1 | 6/2015 | Volfson |
| 2015/0309398 A1 | 10/2015 | Volfson |

FOREIGN PATENT DOCUMENTS

| | | |
|---|---|---|
| WO | 8706717 A1 | 11/1987 |
| WO | 2006035447 A2 | 4/2006 |

OTHER PUBLICATIONS

SIPO; First Office Action issued in CN Patent Application No. 201880018409.2, dated Mar. 30, 2021; 18 pages including English translation.
International Preliminary Report on Patentability issued in International Patent Application No. PCT/US2018/013664, dated Jul. 16, 2019; 13 pages.
PCT International Search Report and Written Opinion in PCT International Application Serial No. PCT/US2018/013664 dated Apr. 27, 2018 (14 pages).
EPO; Extended European Search Report issued in EP Patent Application No. 18739048.9, dated Jan. 18, 2021; 11 pages.
EPO; Partial Supplementary Search Report issued in EP Patent Application No. 18739048.9, dated Sep. 28, 2020; 12 pages.
SIPO Third Office Action and Supplementary Search in Chinese Patent Application Serial No. 201880018409.2 dated Jun. 17, 2022 (15 pages).
SIPO Second Office Action issued in CN Patent Application No. 201880018409.2, dated Dec. 14, 2021; (15 pages).
EPO Communication Pursuant to Article 94(3) EPC in EP Application Serial No. 18739048.9 dated Aug. 4, 2023, 5 pages.

* cited by examiner

CONTINUOUS ZOOM AFOCAL LENS ASSEMBLY

CROSS-REFERENCE TO RELATED APPLICATIONS

This patent application is a national stage application under 35 U.S.C. § 371 of PCT International Application Serial No. PCT/US2018/013664, filed on Jan. 12, 2018 and entitled CONTINUOUS ZOOM AFOCAL LENS ASSEMBLY, which application claims the benefit of priority to U.S. Provisional Patent Application Ser. No. 62/446,301, filed on Jan. 13, 2017, and entitled CONTINUOUS ZOOM AFOCAL LENS ASSEMBLY. The disclosures of the prior applications are considered part of and are hereby incorporated by reference in their entirety in the disclosure of this application.

FIELD

This disclosure pertains to a continuous zoom afocal lens assembly.

BACKGROUND

Afocal adapters are optical elements usually made of two lenses that take in a beam of parallel rays and either expand it or contract it. Such an optical systems do not have a focal point, rather, the afocal adapter expands the lens that is behind it. Afocal adapters can be used in cameras and telescopes, and can have a fixed denomination.

SUMMARY

Aspects of the embodiments include an optical device that includes a housing; and an afocal lens assembly comprising a zoom lens in the housing, the zoom lens supported in the housing to move along a long axis of the housing.

Aspects of the embodiments includes camera system that include an afocal lens assembly, the afocal lens assembly including an objective lens; a zoom lens; and a collimator lens assembly comprising one or more lens elements to receive light from the zoom lens; a lens driving mechanism coupled to the objective lens and the zoom lens, the lens driving mechanism to move the objective lens and the zoom lens synchronously; a light detector to receive light from the collimator lens; and a display unit to display an image based on light received by the light detector.

Aspects of the embodiment can also include an objective lens residing in the housing proximate a first end of the housing.

In some embodiments, the zoom lens and the objective lens are coupled to a lens driving mechanisms, the lens driving mechanisms configured to move the zoom lens and the objective lens synchronously.

Some embodiments can also include a worm drive within the housing and coupled to the zoom lens and the objective lens, wherein the zoom lens and the objective lens are configured to move synchronously by the worm drive.

In some embodiments, the afocal lens assembly comprises a focusing lens assembly residing in the housing proximate a second end of the housing opposite the first end.

Some embodiments can include a light detection element residing in the housing, positioned to receive light from the focusing lens assembly.

In some embodiments, the light detection element comprises an infrared detector.

In some embodiments, the infrared detector comprises a long wavelength infrared detector.

Some embodiments can include a display unit at the second end of the housing to display images based on light received by the light detection element.

Some embodiments also include a zoom+focus adjustment knob at the first end of the housing to move the zoom lens and the objective lens.

In some embodiments, the zoom lens comprises a spherical lens.

In some embodiments, the zoom lens comprises an aspherical lens.

In some embodiments, the zoom lens comprises a surface grating.

In some embodiments, the light detector comprises a long wavelength infrared light detector.

In some embodiments, one or more of the objective lens, the zoom lens, and the one or more lens elements of the collimating lens assembly comprise a spherical lens.

In some embodiments, one or more of the objective lens, the zoom lens, and the one or more lens elements of the collimating lens assembly comprise an aspherical lens.

In some embodiments, one or more of the objective lens, the zoom lens, and the one or more lens elements of the collimating lens assembly comprise a grating surface.

In some embodiments, the lens driving mechanism comprises one of a worm drive or a motor driven track.

Some embodiments can include an adjustment knob coupled to the lens driving mechanism, the adjustment knob configured to rotate and cause the lens driving mechanism to move the objective lens and the zoom lens.

DETAILED DESCRIPTION

This disclosure describes a continuous zoom afocal device that facilitates smooth zooming. Afocal attachments of different magnifications are desirable for use in thermally calibrated fixed focal length long wavelength infrared (LWIR) optical systems. Though thermal imaging applications are discussed above, the continuous zoom afocal device described herein can also be used for visible optical applications.

A benefit of the design presented herein is that the lens that is already mounted and calibrated on the camera itself does not need to be removed.

A design is presented herein that includes and claims:

An optical device that facilitates movement of two groups of lenses synchronously. Such movement can be facilitated by a worm drive, for example, or by other mechanisms.

A long wavelength infrared (LWIR) afocal zoom lens with spherical elements that zooms from X to Y magnification.

A LWIR afocal zoom lens that is designed for good performance over a 74 degree field of vision (FoV) at a sensor side of the optical device.

A LWIR afocal zoom lens that even with large FoV has no vignetting.

A LWIR afocal zoom lens that forms an intermediate image within the lens such that the moveable zoom element is in the vicinity of the intermediate image and functions to provide variable power for the zoom function and also functions as a field lens, bending the light flux in such a way as to both minimize lens diameters and avoid vignetting.

In some implementations, the lens assembly can include 4 optical elements. In some implementation, the adapter includes 4 optical elements. The first two elements L1 and L2 are fixed, the third L3 is moveable and provides the zoom function, while the fourth element L4 moves to provide focus adjustment.

In some implementations, the lens assembly can include three elements, wherein one of the elements is aspheric.

Figure 1A:
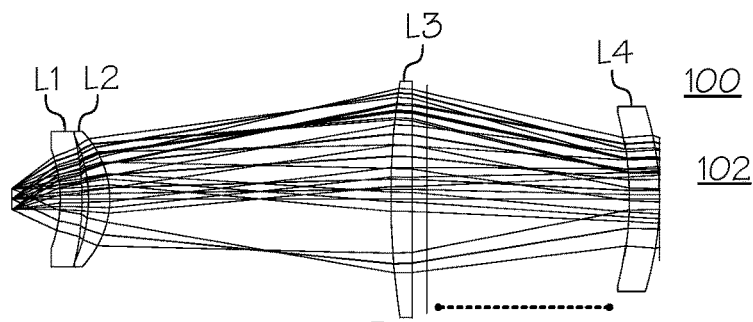
FIGS. 1A-1G are a schematic diagrams representing various lens positions and corresponding light paths through lenses of the continuous zoom afocal device in accordance with embodiments of the present disclosure.
Figure 5:
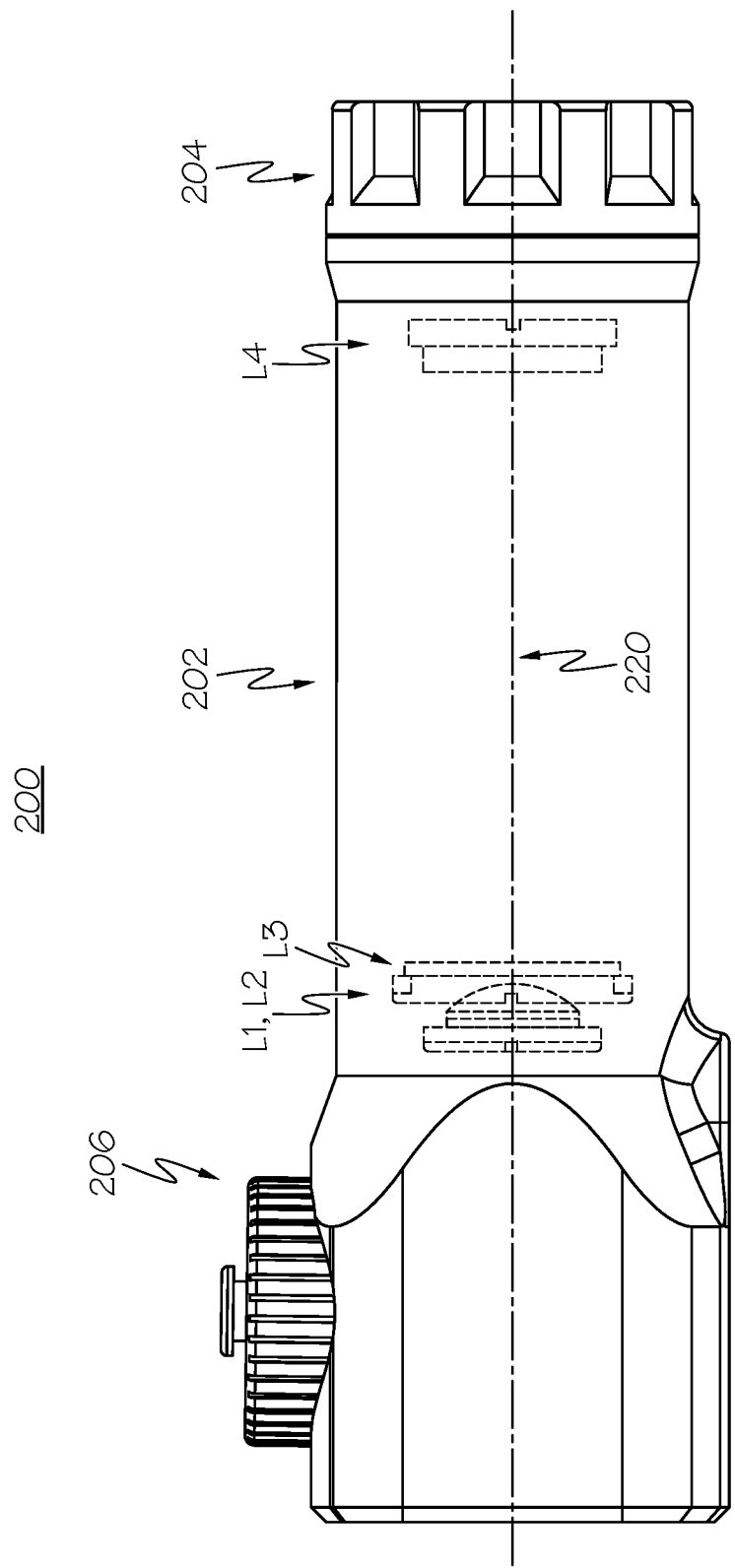
FIG. 5 is a schematic diagram of a semi-transparent side view of the continuous zoom afocal device in accordance with embodiments of the present disclosure.

There are other implementations where better color correction is desired, and is accomplished by way of a diffractive surface on one of the lens elements The lens in various zoom configurations is shown in FIGS. 1A-1G. FIGS. 1A-1G are schematic illustrations of the lens assembly 100 for a continuous zoom afocal optical device. FIG. 1A illustrates the lens assembly 100 in a first configuration 102. The lens assembly 100 includes four lenses: a first lens L1 and a second lens L2 can be stationary, immovable lenses secured within a housing (as shown in FIG. 5). The first lens L1 and the second lens L2 can be focusing lenses that focus light towards a light detector.

The lens assembly 100 can include a third lens L3. The third lens L3 can be a zoom lens that can move along a long axis of a housing. In some embodiments, the third lens L3 can also rotate about the long axis as the third lens L3 translates along the long axis of the housing (shown in FIG. 5). The lens assembly 100 also includes a fourth lens L4, which can be an objective L4. The fourth lens L4 can also move for focusing adjustment. As shown in the FIGS. 1A-1G, the third lens L3 and the fourth lens L4 and can move synchronously to provide continuous zoom in the afocal lens configuration.

Figure 1B:
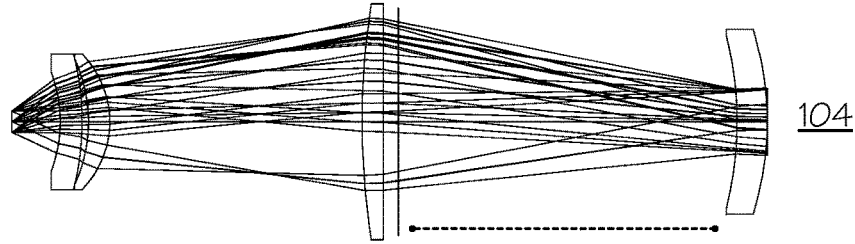
Figure 1C:
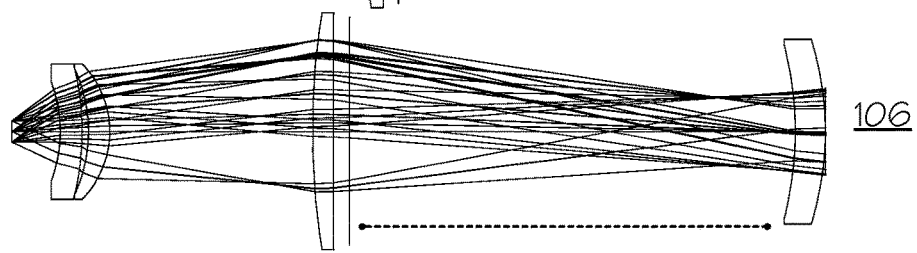
Figure 1D:
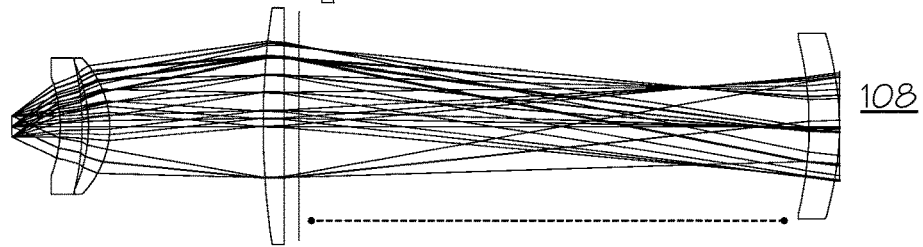
Figure 1E:
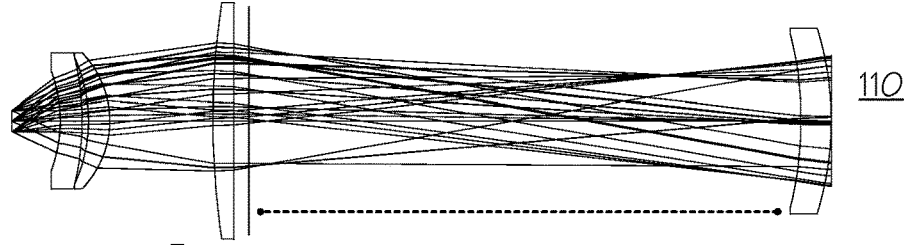
Figure 1F:
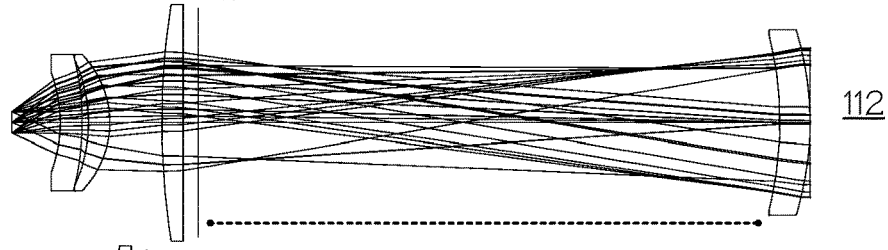
Figure 1G:
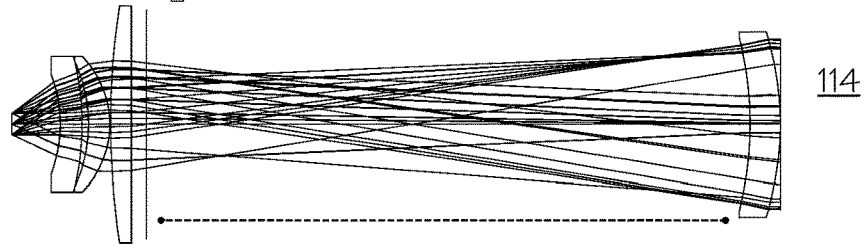

FIGS. 1A-1G illustrate various lens positions, as well as example optical light rays representing how light is refracted through the lenses. The relative position of the third lens L3 to the fourth lens L4 is illustrated by a dotted line segment. In FIG. 1A, a first lens position 102 is illustrated. This lens position 102 can be representative of a first magnification of light entering the fourth lens L4. In FIG. 1B, a second lens position 104 is illustrated. This second lens position 102 can be representative of a second magnification of light entering the fourth lens L4. In FIG. 1C, a third lens position 106 is illustrated. This third lens position 106 can be representative of a third magnification of light entering the fourth lens L4. In FIG. 1D, a fourth lens position 108 is illustrated. This fourth lens position 108 can be representative of a fourth magnification of light entering the fourth lens L4. In FIG. 1E, a fifth lens position 110 is illustrated. This fifth lens position 110 can be representative of a fifth magnification of light entering the fourth lens L4. In FIG. 1F, a sixth lens position 112 is illustrated. This sixth lens position 112 can be representative of a sixth magnification of light entering the fourth lens L4. In FIG. 1G, a seventh lens position 114 is illustrated. This seventh lens position 114 can be representative of a seventh magnification of light entering the fourth lens L4.

Table 1 provides a non-limiting example of the effective focal length of L1, L2 and L3, along with the focal length of L4. The ratio corresponds to the zoom. Additionally the optical "work," meaning the optical power multiplied by the zero field ray height, of L3 is shown. Where the values are low, that indicates where L3 is functioning primarily as a field lens.

TABLE 1

| Zoom | Focal length of L1, L2 and L3 | Focal length of L4 | Optical "work" of L3 |
|---|---|---|---|
| 2 | 23.2 | 47.82 | 0.0558 |
| 3 | 15.5 | 47.82 | 0.0366 |
| 4 | 11.8 | 47.82 | 0.0175 |
| 5 | 9.5 | 47.82 | 0 |
| 6 | 7.9 | 47.82 | −0.02 |
| 7 | 6.8 | 47.82 | −0.038 |
| 8 | 5.9 | 47.82 | −0.05 |

Figure 2:
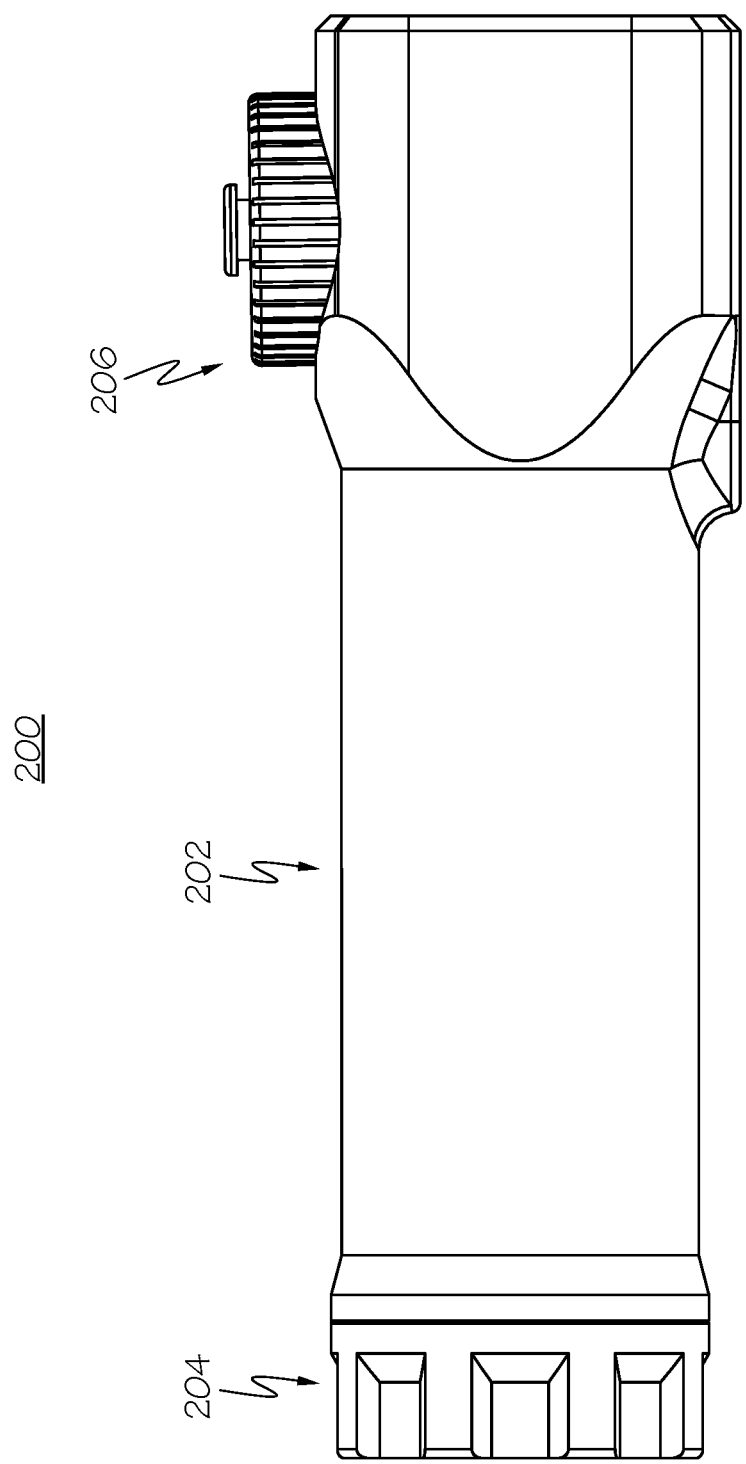
FIG. 2 is a schematic diagram of a side view of the continuous zoom afocal device in accordance with embodiments of the present disclosure.

FIG. 2 is a schematic diagram of a side view of the continuous zoom afocal optical device 200 in accordance with embodiments of the present disclosure. In FIG. 2, the continuous zoom afocal device is shown with a housing 202 covering the lens assembly (e.g., lens assembly 100). The housing 202 can contain other features of the device 200, including, but not limited to a lens driving mechanism, such as a worm drive, a light detector element, such as a LWIR detector element, a display element, power circuitry and battery, etc.

A zoom+focus adjustment knob 204 is shown. The zoom+focus adjustment knob 204 is configured to adjust the third lens L3 and the fourth lens L4 synchronously to provide continuous zoom capability. A battery cap 206 is also shown in FIG. 2, which can contain a lithium or other type of batter to supply power to various powered elements of the optical device 200.

Figure 3:
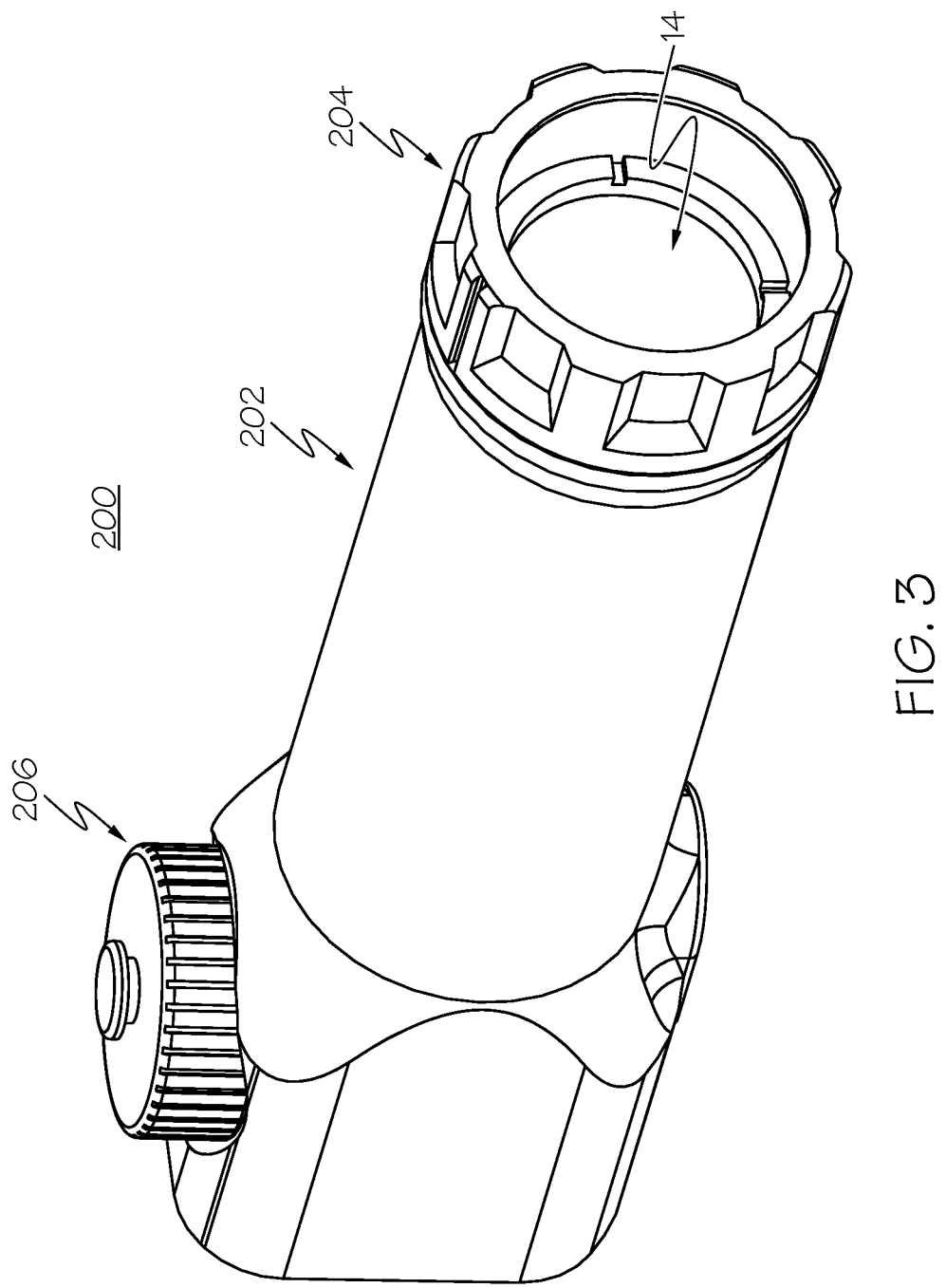
FIG. 3 is a schematic diagram of a first perspective view of the continuous zoom afocal device in accordance with embodiments of the present disclosure.
Figure 4:
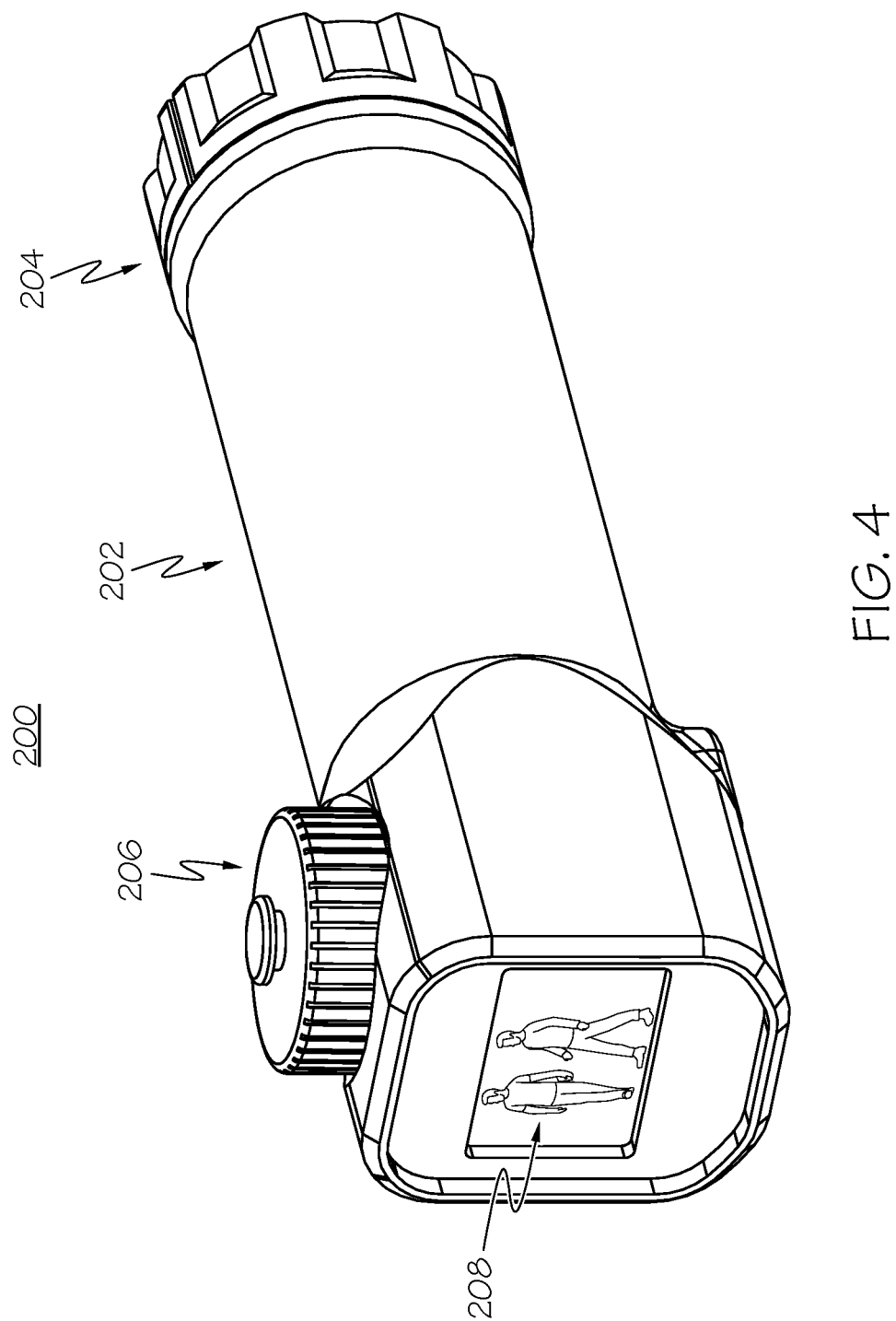
FIG. 4 is a schematic diagram of a second perspective view of the continuous zoom afocal device in accordance with embodiments of the present disclosure.

FIG. 3 is a schematic diagram of a first perspective view of the continuous zoom afocal optical device 200 in accordance with embodiments of the present disclosure. In FIG. 3, the objective lens (fourth lens L4) is shown proximate the zoom+focus adjustment knob 204. FIG. 4 is a schematic diagram of a second perspective view of the continuous zoom afocal optical device 200 in accordance with embodiments of the present disclosure. The view screen 208 is shown on one end of the device, on a side opposite the zoom+focus adjustment knob 204.

Figure 6:
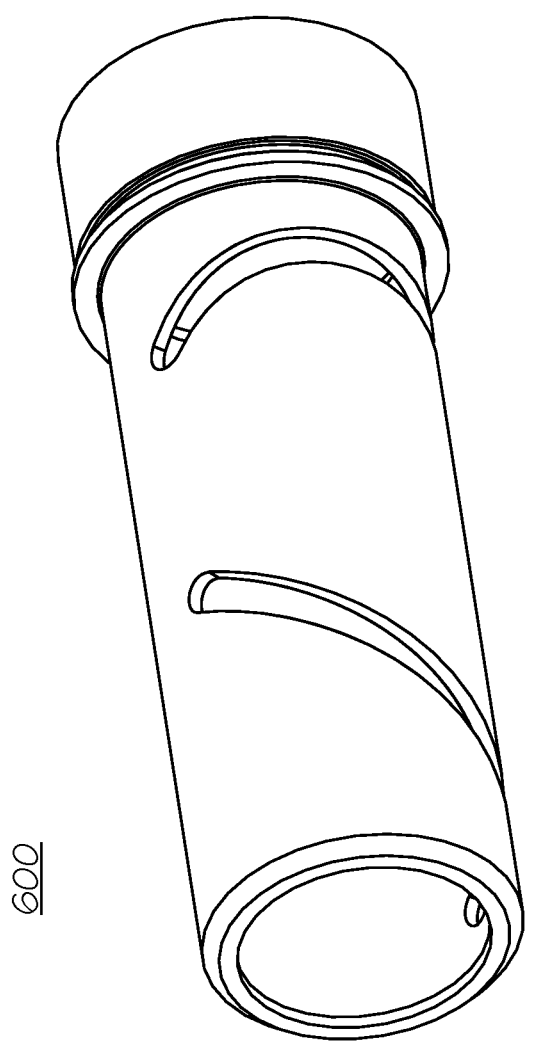
FIG. 6 is a schematic diagram of an example worm drive cam in accordance with embodiments of the present disclosure.

FIG. 5 is a schematic diagram of a semi-transparent side view of the continuous zoom afocal optical device 200 in accordance with embodiments of the present disclosure. The lenses L1, L2, L3, and L4 are shown in an example, non-limiting lens position. The mechanism to move the lenses can include a worm drive, a motor-driven track, or other technique for moving the lenses. An example worm cam 600 is illustrated in FIG. 6. FIG. 6 is a schematic diagram of an example worm drive cam 600 in accordance with embodiments of the present disclosure. The worm drive cam 600 can include slots for receiving worm drive pins for controlling the position of the third lens L3 and the fourth lens L4 relative to each other during zoom+focus adjustment.

The third lens L3 and the fourth lens L4 can move along a direction parallel to the long axis 220 of the housing. In embodiments, the third lens L3 and the fourth lens L4 can also rotate about the long axis 220 as the third lens L3 and the fourth lens L4 translate along the axis 220.

The zoom+focus adjustment knob 204 is configured to rotate, and upon rotation, can move the third lens L3 and the fourth lens L4, in a configuration similar to that shown in FIGS. 1A-G.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An optical device comprising:
   a housing;
   an afocal lens assembly in the housing, the afocal lens assembly comprising a zoom lens and an objective lens, the zoom lens and objective lens supported in the housing to move along a long axis of the housing;
   a lens driving mechanism coupled to the zoom lens and the objective lens; and
   zoom+focus adjustment knob coupled to the lens driving mechanism;
   wherein the objective lens is configured to move synchronously with the zoom lens along the long axis based on rotation of the zoom+focus adjustment knob.

2. The optical device of claim 1, further comprising a worm drive within the housing and coupled to the zoom lens and the objective lens, wherein the zoom lens and the objective lens are configured to move synchronously by the worm drive.

3. The optical device of claim 1, wherein the afocal lens assembly comprises a focusing lens assembly residing in the housing proximate a second end of the housing opposite the first end.

4. The optical device of claim 3, further comprising a light detection element residing in the housing, positioned to receive light from the focusing lens assembly.

5. The optical device of claim 4, wherein the light detection element comprises an infrared detector.

6. The optical device of claim 5, wherein the infrared detector comprises a long wavelength infrared detector.

7. The optical device of claim 3, further comprises a display unit at the second end of the housing to display images based on light received by the light detection element.

8. The optical device of claim 1, wherein the zoom lens comprises a spherical lens.

9. The optical device of claim 1, wherein the zoom lens comprises an aspherical lens.

10. The optical device of claim 1, wherein the zoom lens comprises a surface grating.

11. A camera system comprising:
    an afocal lens assembly, the afocal lens assembly comprising:
      an objective lens;
      a zoom lens; and
      a collimator lens assembly comprising one or more lens elements to receive light from the zoom lens;
    a lens driving mechanism coupled to the objective lens and the zoom lens;
    an adjustment knob coupled to the lens driving mechanism, wherein the objective lens is configured to move synchronously with the zoom lens based on rotation of the adjustment knob;
    a light detector to receive light from the collimator lens; and
    a display unit to display an image based on light received by the light detector.

12. The camera system of claim 11, wherein the light detector comprises a long wavelength infrared light detector.

13. The camera system of claim 11, wherein one or more of the objective lens, the zoom lens, and the one or more lens elements of the collimating lens assembly comprise a spherical lens.

14. The camera system of claim 11, wherein one or more of the objective lens, the zoom lens, and the one or more lens elements of the collimating lens assembly comprise an aspherical lens.

15. The camera system of claim 11, wherein one or more of the objective lens, the zoom lens, and the one or more lens elements of the collimating lens assembly comprise a grating surface.

16. The camera system of claim 11, wherein the lens driving mechanism comprises one of a worm drive or a motor driven track.

* * * * *